J. M. KROYER.
TRACTOR.
APPLICATION FILED NOV. 28, 1919.
1,379,107.
Patented May 24, 1921.
2 SHEETS—SHEET 1.
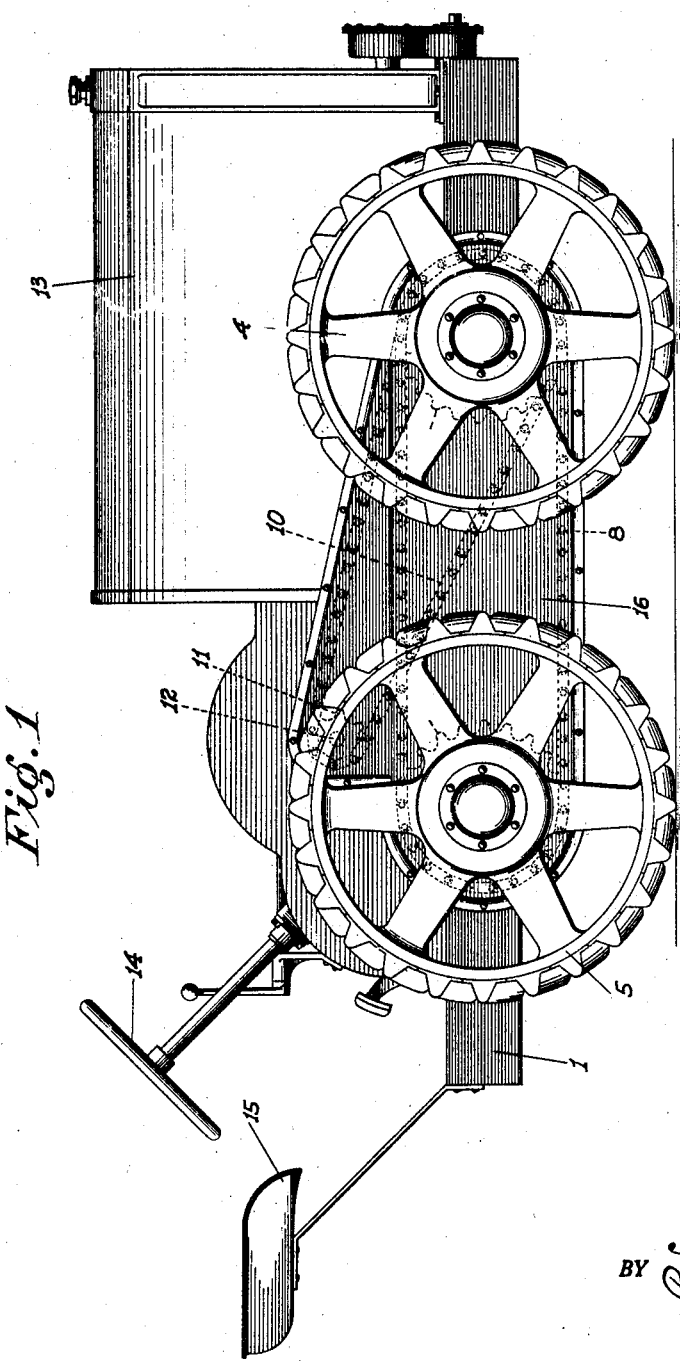
INVENTOR.
J. M. Kroyer
BY
ATTORNEY

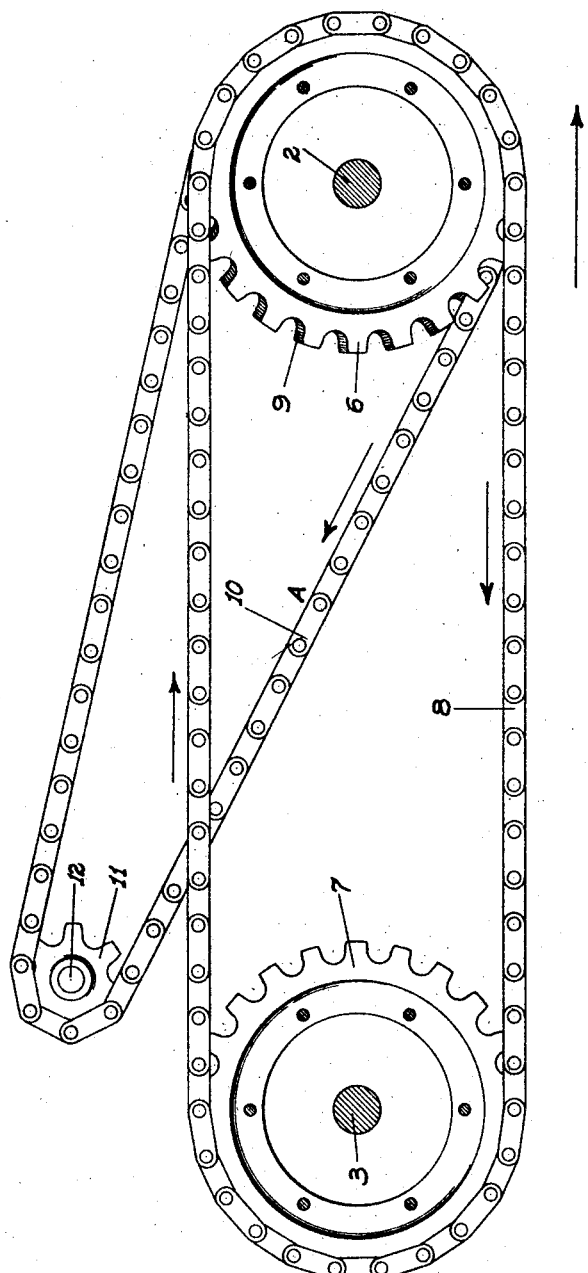

UNITED STATES PATENT OFFICE.

JOHN MINOR KROYER, OF STOCKTON, CALIFORNIA.

TRACTOR.

1,379,107.  Specification of Letters Patent.  Patented May 24, 1921.

Application filed November 28, 1919. Serial No. 340,985.

*To all whom it may concern:*

Be it known that I, JOHN MINOR KROYER, a citizen of the United States, residing at Stockton, in the county of San Joaquin, State of California, have invented certain new and useful Improvements in Tractors; and I do declare the following to be a full, clear, and exact description of the same, reference being had to the accompanying drawings, and to the characters of reference marked thereon, which form a part of this application.

This invention relates to improvements in tractors and particularly to those of the all wheel-drive type.

The principal object is to so transmit the power of the engine to the driven wheels that the tractor will never have any tendency to rear up at its forward end no matter how great a load the tractor may be pulling, nor how suddenly the power may be applied to the wheels.

This feature marks a great improvement over tractors as at present built, since they all, as far as I know, have this tipping-up tendency to a greater or lesser extent, rendering them not only dangerous to operate, but difficult to control and steer.

A further object of the invention is to so apply the power to the wheels on each side independently of those on the other that the power will be evenly distributed to each of the wheels.

In certain fundamental principles of operation and construction, the present invention is the same as that shown in my pending application for patent Serial No. 258,971, Filed October 21, 1918, and is an improvement thereover.

Another object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a side elevation of my improved tractor.

Fig. 2 is an enlarged detached view showing the driving connection of the power shaft with the wheels.

Referring now more particularly to the characters of reference on the drawings, the numeral 1 denotes the frame of the tractor transversely and rigidly mounted in which are a pair of spaced front and rear axles 2 and 3, on each of which is turnably mounted a pair of ground-bearing wheels 4 and 5 respectively.

To the front wheels 4 are secured sprocket wheels 6 and to the rear wheels 5 similar and equal sized sprocket wheels 7, the sprocket wheels on each side being connected by an endless drive chain 8.

A sprocket wheel 9 is secured to each of the front sprockets 6 adjacent the inner faces thereof, having endless drive chains 10 there around and around small pinion sprockets 11 mounted on a drive or jackshaft 12, positioned above and between the axles 2 and 3 and parallel thereto.

These pinions 11 are arranged to be turned independently or together by the engine 13 of the tractor, by a means similar to that employed in the co-pending application previously mentioned, such means being actuated through the medium of a hand or steering wheel 14 mounted adjacent to the driver's seat 15 positioned at the rear end of the tractor.

The wheels on each side then, act as one unit independently of those on the other. This arrangement I utilize to steer the tractor but if the forward wheels lose their frictional or tractive contact with the ground, this method of steering loses its effectiveness, and as a result the tractor is "tender" and hard to control.

A suitable housing 16 covers the chain and sprocket units on each side of the tractor, in order to exclude dirt and dust and to enable them to run in a bath of oil.

The principles of operation and the advantages of my improved driving connections are substantially as follows:—

When the power from the power unit is applied directly to the rear wheels of a tractor, as is now the common practice, there is of course a reactionary force backward, and downward. If the power thus applied is great enough or is applied suddenly this reactionary force becomes sufficient to overcome the weight of the tractor forward of the rear axle. Thus there is a tendency on the part of the tractor to tilt upward at the front end. If this reactionary force is great enough the tractor will tip over backward and in any event the forward wheels will not have the traction which they should.

Now, by applying the power to the front wheels first, this same re-active force, which is so detrimental when the power is applied to the rear wheels, becomes a real advantage, as will be seen from the following explanation, viz:—

Power applied on the upward moving portion "A" of the chain 10 when driving the tractor in a forward direction exerts a downward pressure in foot-pounds on the front axle 2 equal to the power times the radius of the sprocket wheel 9, which is the same as that of the sprocket wheels 6 and 7.

A reactionary force also acts backward and downward on the axle 3, which force is a pressure in foot-pounds equal to the force acting on the axle 2, divided by the distance between the two axles.

This reactionary force is that which tends to tip the tractor when the power is applied to the rear axle first, since it is sometimes great enough to overcome the weight of the tractor over the front axle. When power is applied to the front axle first, however, the support of the rear axle plus the pressure on the front axle is sufficient to resist this reactionary pressure and enables the tractor to maintain its horizontal equilibrium.

To illustrate this principle in another way, let us assume that the forward wheels, and hence the forward sprockets 6 and 9, are held against turning and forward movement, while the remainder of the tractor is free to turn the axle 2 as an axis. If the power is then applied to the chain 10 as before, that portion of the tractor to the rear of the axle 2 will tend to turn about said axle in a counter-clockwise direction with the reactionary force mentioned which, at the point of contact of the wheels 5 with the ground, will be a pressure equal to the force acting on the axles 2 and 3, as stated. This then will both give a good tractive pressure to said wheels 5 and at the same time the equilibrium of the whole tractor will be maintained. With the general dimensions shown on the drawings, this indirect or reactionary pressure on the wheels 5 will be approximately one-fourth of the total force disregarding the pressure of gravity, or in other words, the weight of the machine, of which about 60% is preferably over the front axle, and 40% over the rear axle.

This downward pressure on the front axle plus the support of the rear axle, eliminates any tendency of the tractor to tip up at the forward end, when moving in a forward direction.

When backing up, however, the reverse of the above directions of force takes place, but since, when reversing, no load is being pulled, it becomes a matter of no importance, since the tractor will never rear up at either end when running light.

It will be seen that in my construction, the entire power of the engine is applied to the front wheels to turn the same, that portion of the power which is not absorbed by said wheels is transmitted to the rear wheels by the chains 8. This power thus applied to the rear wheels is figured to be between 40 and 50% of the total.

It will be clearly seen therefore, that by applying the power of the tractor to front axle first the equilibrium of the machine is maintained. Then by connecting the front axle in driving relation with the rear an almost uniform traction will be had on all four wheels.

From the foregoing description it will be readily seen that I have produced such a device as substantially fulfills the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A driving means for a four wheel driven tractor including a means for applying the power of the tractor to the front wheels thereof at a constant point relative to the axis of rotation, the front and rear wheels being connected in driving relation with each other.

2. A driving means for a four wheel driven tractor including sprockets connected with the front wheels of the tractor, sprocket chains mounted in driving relation with the power unit of the tractor and with said sprockets whereby the driving power of the tractor will be applied to the front wheels at a constant point relative to the axis of rotation, the front and rear wheels being connected in driving relation with each other.

In testimony whereof I affix my signature.

JOHN MINOR KROYER.